Nov. 6, 1962  C. M. EPPARD  3,062,392
ROTARY UNLOADER
Filed Oct. 13, 1960  7 Sheets-Sheet 1

FIG.1

INVENTOR:
CLYDE M. EPPARD
BY Sutherland, Polster + Taylor
ATTORNEYS.

Nov. 6, 1962 C. M. EPPARD 3,062,392
ROTARY UNLOADER
Filed Oct. 13, 1960 7 Sheets-Sheet 3

INVENTOR:
CLYDE M. EPPARD
BY Sutherland, Polster & Taylor
ATTORNEYS.

Nov. 6, 1962

C. M. EPPARD 3,062,392

ROTARY UNLOADER

Filed Oct. 13, 1960

INVENTOR:
CLYDE M. EPPARD
BY Sutherland, Poleter + Taylor
ATTORNEYS.

Nov. 6, 1962     C. M. EPPARD     3,062,392
ROTARY UNLOADER Filed Oct. 13, 1960     7 Sheets-Sheet 6

INVENTOR:
CLYDE M. EPPARD

BY Sutherland, Polster & Taylor
ATTORNEYS.

United States Patent Office 3,062,392
Patented Nov. 6, 1962

3,062,392
ROTARY UNLOADER
Clyde M. Eppard, 8908 Fair Oaks Drive,
East St. Louis, Ill.
Filed Oct. 13, 1960, Ser. No. 62,498
20 Claims. (Cl. 214—14)

This invention relates to a rotary unloader for removing bulk material from storage and more specifically to a rotary unloader machine which is particularly adapted by its construction and mode of operation to remove bulk material from the hold of a ship or a barge and primarily from the latter.

A large proportion of bulk material is shipped by barge and this is particularly true over freight traffic routes provided by the inland waterways of this country. The barges used in this traffic may have a hold in the neightborhood of 20 to 50 feet wide, 10 feet deep and a length several times their width. Of course, these dimensions will vary with the characteristic of the waterway which controls, of course, the barge size, but this will serve as a typical example since the problem is one of unloading the hold in the barge regardless of size. Where the nature of the bulk material permits, such as coal, the present preferred method is to moor the barge and unload by a mechanical shovel of one form or another. Because of the limitations imposed by the size of the hold to be unloaded on the shovel size, the unloading rate for the barge does not exceed 600 to 800 t.p.h. (tons per hour). At this rate, the unloading is a comparatively slow process to loading, and it becomes at once apparent that when a shipment of several barges is received, the unloading time will extend over a period of several days, thus, increasing the demurrage charge on the barges. Further, it must be realized that modern power plants consume coal at a much higher rate than the capacity of a single shovel, even when operated at a 24 hour basis. This necessarily means that more than one shovel must be operated continuously, increasing both capital invested and operating expense. The real need, therefore, is for a different type of machine, operating on a different principle which will speed up the unloading operation.

According to this invention, a new machine is proposed which unlike the shovels operates on a rotary principle. This unloading machine may be either a stationary or portable machine, but in either form it is characterized by a rotating loading wheel carrying a series of open ended buckets facing in the direction of rotation. For the particular purpose described, the wheel and its buckets would be about 20 feet in diameter and the wheel and each bucket from 4 to 5 feet wide. This wheel is in turn supported on a traversing type of carriage movable along a boom, and the boom in turn is mounted at least for vertical movement on its supports which supports may be of the portable or stationary kind. The aforementioned carriage mounts the rotary unloading wheel traverse of the boom so that the buckets discharge above the boom to a conveyer means carried by the boom which moves the material along the boom to storage. A suitable, variable speed drive for the wheel is in turn mounted on the carriage.

To perform the unloading operation, the boom, carriage and wheel are raised to a position to clear a barge, and the latter is maneuvered into position beneath the boom, and then connected fore and aft to wire cables or the like extending from one or more winches which are power operated. These power winches can have a remote control for an electric drive or the like and by manipulation of the control in turn position the barge longitudinally under the boom which will then extend beyond each side of the barge. The machine is then operated to drive the wheel and conveyer means on the boom, and the boom in turn lowered to commence the digging operation to unload the barge. This is continued by moving the barge slowly, first in a direction opposite to wheel rotation until the wheel traverses the length of the hold. While the wheel continues to dig, it is moved traversely of the barge hold by moving the carriage, and then the barge is moved under the wheel in the same direction of rotation back to the opposite end. In this manner, the unloading takes place by digging the load off the top of the hold at a substantially uniform rate and in a substantially uniform manner. By operating the machine according to this schedule, the coal could be removed in two or three layers. Since the wheel will continue to dig regardless of the direction of movement of the barge with respect to wheel rotation, the action is continuous.

On the other hand, the particular construction hereinafter described would allow unloading by quite a different manner, and that is by lowering the wheel at one end of the hold and allowing it to dig in almost to the bottom of the hold. After this degree of penetration has been achieved, the barge can be traversed beneath the wheel, and the wheel traversed with respect to the barge on the carriage until only a very thin layer of coal is left in the hold which can be removed by a subsequent clean-up operation of the wheel. This system becomes possible when it is understood that the construction permits the wheel to penetrate more than half of its diameter during an unloading operation. Regardless of the system of unloading used, the buckets continually move the coal upwardly to discharge on the conveyer means mounted on the boom where it is moved along the boom to storage. The weight of the wheel and the buckets is sufficient to cause the digging action and the rate of unloading is dependent primarily on the rate of wheel rotation. This is variable so as to obtain a variation of rate from 200 to 4000 t.p.h. This permits different wheel speeds to be used during the skimming or primary skimming of the load and during the clean-up of the bottom of the hold.

This brief description will suffice for a general understanding of the construction and operation, but in the following detailed description other specific mechanisms will be described which adapt the machine for maixmum utilization, reliability and serviceability.

One of the objects of this invention is to provide a rotary machine particularly adapted for unloading bulk material from transporters with open bins or holds.

Another object of this invention is to provide a rotary machine of the type hereinafter described which is flexible and capable of high capacity rates of material handling.

Another object of this invention is to provide a rotary machine of the type described which can be adapted to both a portable and stationary installation without substantial modification.

Another object of this invention is to provide a rotary machine of the type hereinafter described with gravity feeding and gravity discharging.

Another object of this invention is to provide a rotary machine of the type described wherein parts subject to wear and frequent replacement are arranged to be accessible individually or as parts of a readily changeable sub-assembly or sub-assemblies.

Another object of this invention is to provide a rotary machine in which the parts are accessible for ready adjustment.

Another object of this invention is to provide a rotary machine of the type described which provides for changes in barge draft.

Another object of this invention is to provide a rotary machine which is supported so as to automatically compensate for changes in water level.

Another object of this invention is to provide a machine of the type described with parts arranged to occupy minimum head room so as to simplify the supporting structure therefor.

Another object of this invention is to provide a rotary machine with a shock-proof drive train and with wheel mounting which is shock-proof and with parts therein arranged accessible for ready replacement exterior of the wheel and exterior of the drive train.

Another object of this invention is to provide a rotary machine with buckets shaped and sized to permit feeding movement forward, backward or sidewise into the material to be unloaded.

Another object of this invention is to provide a rotary machine with a wheel guard effective on striking to prevent the buckets from engaging solid projections, but not detrimental to bucket operation in the digging operation through the load.

Another object of this invention is to provide a rotary machine with a wheel guard structure to permit fast clean-up of the hold without snagging on riveted joints or stiffeners.

Further objects and advantages of this invention will occur to those skilled in the art after reading the following detailed description which is a full, clear and exact description of the invention when taken with the accompanying drawings which form a parrt thereof and in which:

The following is a detailed description of the general arrangements of elements for a rotary machine to unload transporters of bulk material, such as a barge. The schematic illustrations in the drawings illustrating these arrangements omit engineering detail for the purpose of simplifying the description. Certain sub-assemblies will be described in more detail hereinafter. Any dimensions applied to the parts herein are mostly for the purpose of illustration, it being understood that the size of the machine and of its parts as stated here are given for purposes of example only.

Figure 1:
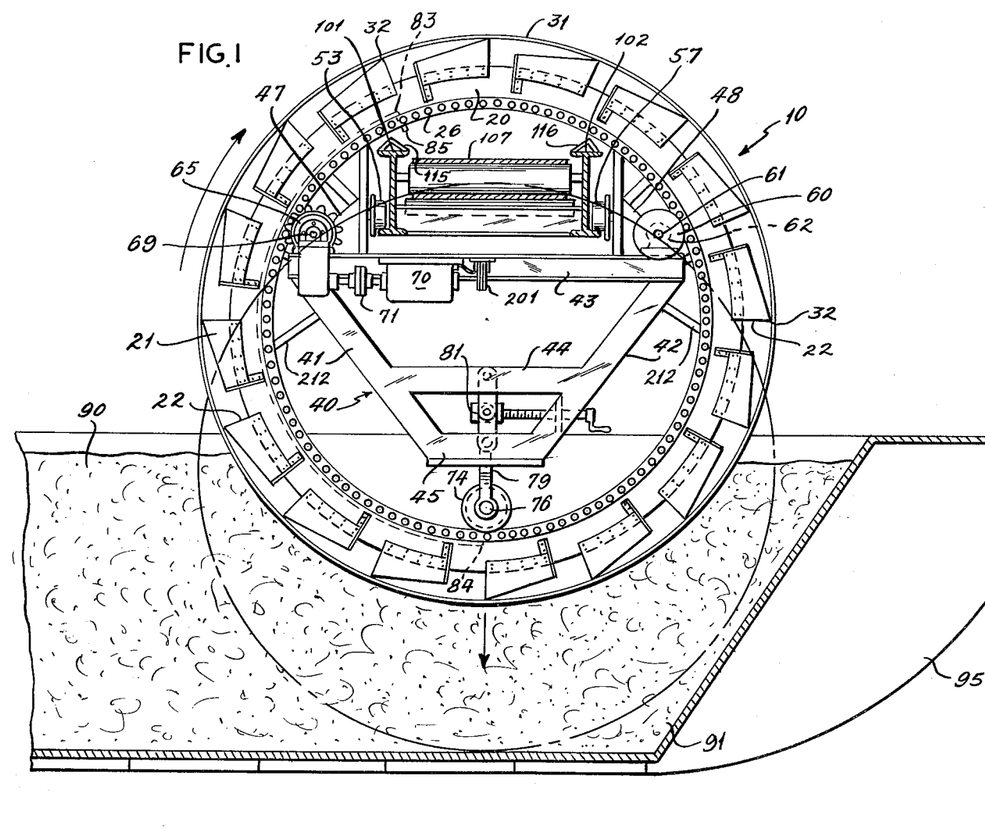
FIG. 1 is an operational view schematically illustrating in elevation a rotary wheel type unloader, its mounting and drive for positioning the rotary type unloader in digging position with relation to bulk material in the hold of a bulk barge.
Figure 2:
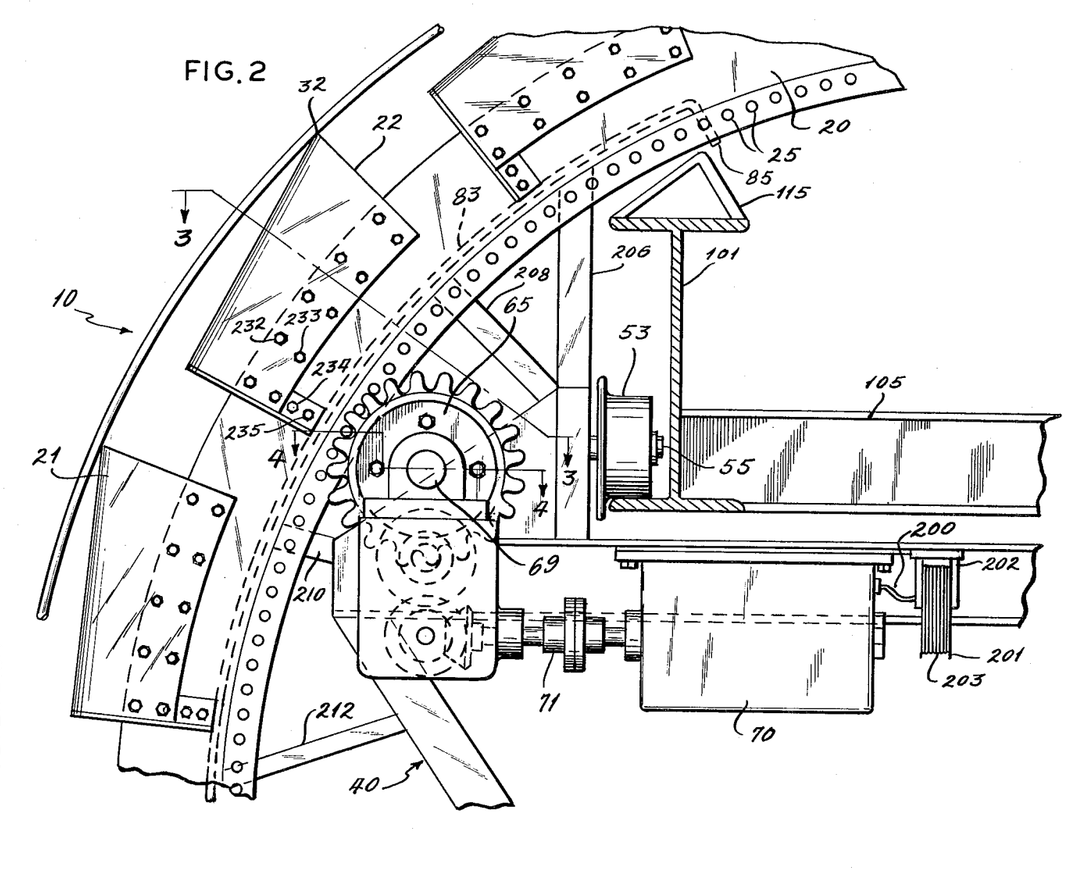
FIG. 2 is a somewhat schematic illustration of a portion of the wheel shown in FIG. 1 enlarged so as to illustrate the construction more in detail.
Figure 3:
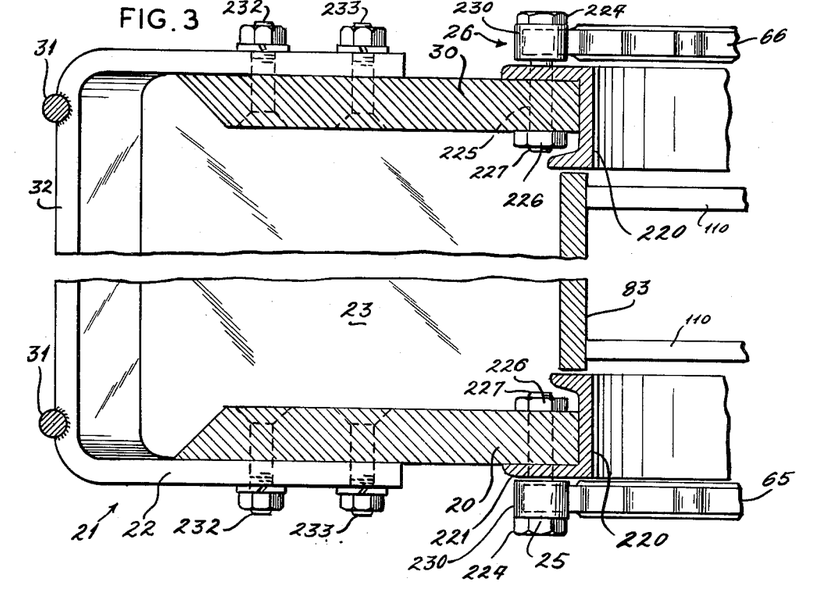
FIG. 3 is a section taken approximately along the line 3—3 of FIG. 2 in the direction of the arrows.

As will be seen hereinafter, the general arrangement of parts and elements forming the invention may take different forms with different characteristics, and one of these forms is best illustrated in FIGS. 1 and 2. With reference to these figures, the arrangement of parts and elements in the first form includes a rotary wheel type of unloader 10, such as shown in FIG. 1 and FIG. 3. This wheel has a pair of metal rings 20 and 30 mounted side by side in a concentric manner and interconnected about their periphery by a plurality of buckets 21 which have open ends 22 and an open inner side 23, as shown in FIG. 3. These buckets may be connected with the rings 20 and 30 in any suitable manner, but it is preferable that the ends 22 (FIG. 3) project laterally from the rings 20 and 30. In other words, the ends of the buckets 22 overhang the rings 20 and 30 at each side. Each of the rings 20 and 30 have spaced teeth 25 and 26 thereon in the form of pins extending transversely through the rings 20 and 30, respectively. These pins are preferably made for ready replacement in a manner to be hereinafter described. One or more anti-snag rings, such as 31, are attached to and surround the leading edge 32 of each of the buckets 21. It is contemplated that the buckets 21 should be at least 4 feet wide and approximately half as deep. The wheel element, generally described above, when constructed in the manner described will have a diameter of about 20 feet and that this will provide, as will be pointed out hereinafter, for effective digging to a depth of at least 12 feet. The weight of the wheel itself will make it unnecessary to provide extra force downwardly on the wheel, but if this is necessary, of course, the weight of the other parts in the assembly is available for this purpose.

The rotary wheel type unloader 10 is rotatably mounted on a carriage 40 which has two triangular truss members connected side by side, cne of which has the members 41, 42, and 43, as shown in FIG. 1. The truss member on the opposite side is constructed in the same manner, and the two trusses are interconnected by transverse braces 44 and 45 at the bottom and by frame members 47 and 48 at their upper ends. Frame member 47 carries a pair of trolley wheels 52 and 53 journalled on stub axles 54 and 55, respectively. Frame member 48 carries a similar pair of trolley wheels 56 and 57, one of which is shown.

The wheel type unloader 10 is mounted on rollers and drive gearing journalled on the carriage 40 which has axially spaced wheel engaging surfaces to engage top and bottom inside the rings 20 and 30. A pair of flanged rollers 60, one of which is shown, are mounted on a shaft 61 in turn journalled in adjustable bearings 62 movably secured on the frame members 43. A pair of flanged rollers 65 and 66 are mounted on a shaft 69 in turn journalled in suitable bearings secured to the opposite ends of a transverse member 43 of the carriage 40. The rollers 65 and 66 have tooth flanges on one side thereof engaging with the pins 25 and 26 to drive the wheel 10. A suitable electric motor 70 and drive gearing 71 is connected to rotate the drive pinions on the rollers 65 and 66. Preferably the drive gearing 71 includes a slip clutch.

The bottom of the wheel 10 is supported on a pair of idlers 74 and 75 which are in turn flanged rollers engaging the rings 20 and 30 supported on a suitable shaft 76 carried in journals 77 and 78. The transverse braces 44 and 45 carry a pair of resilient shock struts 79 and 80 which are adjustable up and down by the tensioning devices 81 and 82 so as to raise and lower the journals 77, 78 which are attached to the bottom of the shock struts. By rotation of the tensioning devices 81 and 82, the pressure of the rollers 74 and 75 on the rings 20 and 30 can be varied, in fact, when it is desired to change wheels 10, all that is necessary is to relax the tension of the devices 81 and 82 retracting the rollers 74 and 75 so as to disengage from the rings 20 and 30. The shock struts 79 and 80 will yield allowing the wheel to rock on the carriage in case the wheel strikes an obstruction during the loading operation. Rocking motion will have no effect upon the rotary support for the wheel 10, since even if the rings leave the adjustable support rollers 60, the wheel will not come off the carriage. The driving force on the wheel 10 may be great enough, however, to make the pinions 65 and 66 jump a tooth or two on the wheel or cause the slip clutch in the drive 71 to operate. In either case, however, the parts are designed rugged enough so that no damage can be done to the machine. Between the rings 20 and 30, there is also provided a resilient metal mold board, indicated by the dotted lines 83 in FIG. 1. The mold board 83 extends from a point 84 at the bottom of the wheel to a lip 85 at the top of the wheel. The mold board extends the full width between the rings 20 and 30 closes the inner side of the buckets 21 so that the buckets can dig in any direction of movement into the pile, sidewise or endwise. In any case, the material in the pile 90, as shown in FIG. 1, will be scooped into the buckets, and each of the buckets in turn filled and carried up to the point 85 where the buckets will be emptied. As shown in FIG. 1, the buckets are being advanced relative to the pile in a direction to the left, and the digging is shown as being of the full depth of the hold 91 of the barge 95. It is not necessary to operate the wheel in this manner, however, since it is just as possible to scoop off 2 or 3 feet from the pile 90 in any direction of movement of the wheel, and by subsequent skimming operations move downwardly progressively to the bottom of the hold 91. However, it will be noted that all of the truss members in the supporting carriage are within the confines of the wheel 10 and its structure. There is no part of the carriage which would impede progress of the wheel in any direction, and at least more than half of the wheel is available for digging. This lowers the diameter of the wheel necessary to perform the function, since the only limit to the depth to which the wheel can dig is determined not by the carriage or any parts of the wheel carried thereon, but only by clearance between the bottom of the boom on which the carriage rides and the upper portion of the barge.

Figures 4, 6:
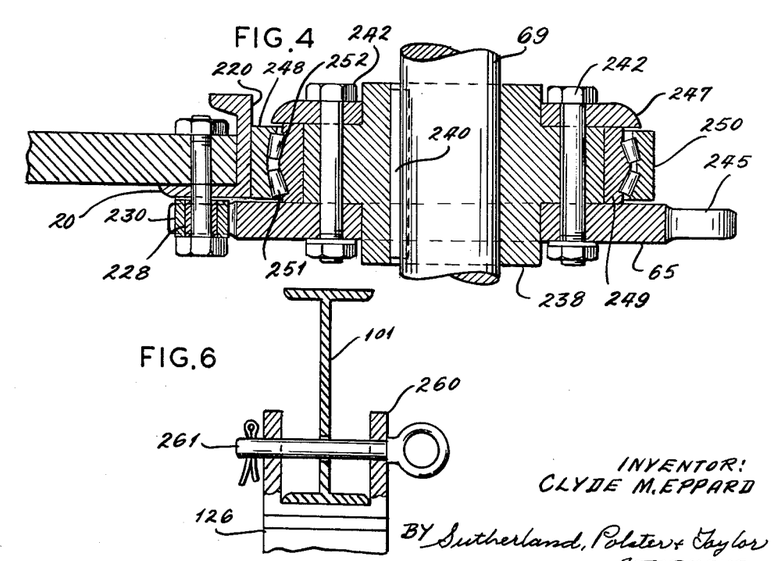
FIG. 4 is a sectional view taken substantially along the line 4—4 of FIG. 2 looking in the direction of the arrows.
FIG. 6 is a fragmentary sectional view of an enlarged scale illustrating the connection between one of the supports shown in FIGS. 5a and b to the boom carrying the rotary wheel type unloader.

Before proceeding with a detailed description of the boom assembly and its support, reference is made to FIGS. 2, 3 and 4 showing details of construction of the carriage and the rotary wheel type unloader. As shown in a larger scale in FIG. 2, power to drive the motor 70 is obtained from an electric connection 200 with a cable reel 201 rotatably mounted on a bracket 202 carrying a cable 203. The cable 203 traverses the length of the boom, aforementioned, to a control station (not shown). At the control station are the suitable controls for operating the entire machine, and these would be located preferably above the rotary wheel type unloader 10 so that observation of the action of the wheel could be constantly supervised and the controls operated accordingly. At this control station would be located all of the various controls for operating the various power equipment for the entire assembly. Preferably, the motor 70 is a direct current variable speed type of motor which drives through the gearing 71, heretofore briefly mentioned, to operate a pair of combined rollers and drive pinions 65 and 66, one of which is shown in FIG. 2.

The members 41 and 47 of the carriage 40 have a plurality of truss members attached thereto, and these truss members 206, 208, 210 and 212, as shown in FIG. 2, are mounted in pairs side by side and attached to the mold board 83. It will be understood that the other truss members, such as 205 which corresponds with 206 and 207 which corresponds to 208, are not shown in this view. Turning now to FIG. 3, the edges of the mold board 83, which is in effect a stainless steel plate of curved shape corresponding to the wheel 10, terminate adjacent L-shaped wear plates, such as 220, which are circular and attached to the inner periphery of the rings 20 and 30. Only one of these wear plates is described since the corresponding wear plate on the ring 30 is exactly the same as the wear plate 220 except reversed. Wear plate 220 has a circular flange 221 which is secured to the inner periphery of the ring 20 by the pins 25, heretofore mentioned, which in this case take the form of bolts with enlarged heads 224. These bolts 25 extend through the circular web or flange 221 and the ring 20 and are secured in place by nuts 226 on the threaded ends thereof 227. The heads 224 are spaced from the circular flange 221 by hardened bushings 228 (FIG. 4) upon which are rotatably journalled the rollers 230. These rollers are in turn engaged by the teeth of the drive pinions 65 and 66 so as to propel the wheel 10 on its rotatable supports mounted on the carriage as heretofore described. The outer periphery of each ring 20 and 30 carries the buckets 21, and the sides of the buckets 21 (FIG. 3) are secured at the periphery by a plurality of bolts 232, 233, 234 and 235, respectively.

Turning now to FIG. 4, herein is illustrated on an enlarged scale details of one of the drive pinions 65. It will be understood that the other drive pinion 66 is constructed in the same manner. Drive shaft 69, which in turn is connected with the drive gearing from the motor 70, mounts a hub 238 which is keyed to the shaft 69 at 240. The hub preferably has a press fit with the shaft 69 and is not readily removable. However, as will be seen hereinafter, the drive pinion 65 and roller mounted thereon, which are the wearing parts, are removable. These parts are removably attached to the hub by a plurality of bolts 242 around the outer periphery of the hub which extend through the hub and secure against the hub, the drive pinion 65 having the external teeth 245 engaging with the several rollers 230 at the inner periphery of the ring 20. Bolts 242 also secure a retaining ring 247, and between the retaining ring 247 and the pinion is a roller structure 248 which engages with the face of the wear plate 220 on the inner periphery of the ring 20. Roller 248 is constructed with an inner roller race 249 and an outer roller race 250 supported on the inner race 249 by a plurality of pairs of tapered roller bearings, such as indicated at 251 and 252. Thus, the outer race of the roller 248 can rotate on the inner race of the roller 248 so as to compensate for the different surface speed in rotation between ring 20 and roller 248 caused by the difference in diameter between the driving pinion 65 and the roller 248. The construction just described for the rotary wheel type unloader and the carriage is the same in all forms of the assembly hereinafter described. It, therefore, will not be necessary to repeat this description for each form. This also holds true for the construction of the boom used in each form upon which the carriage and rotary wheel type unloader are mounted. The boom structure is perhaps best shown in FIGS. 5a and b, although some details thereof are shown both in FIGS. 1 and 2.

The aforementioned boom as indicated generally by the reference character 100 has two side by side I-beam members 101 and 102 which are approximately 3 feet in depth from flange to flange. These two I-beams are separated by suitable spacing members in the form of I-beams 104, 105, etc., which are spaced at intervals along the length of the boom 100. Nested between the two webs of the I-beams 101 and 102 is a conveyer belt, generally indicated as 107, powered by a motor 108 through a suitable belt and pulley arrangement 109 which drives one end pulley 110 for the conveyer belt. The other end of the conveyer belt is supported by the adjustable pulley 112. This is a conventional conveyer structure of a well-known type and it is contemplated that the belt of this conveyer 107 be about 6 feet wide. Along the tops of the I-beams 101 and 102 are deflector surfaces 115 and 116 primarily for the purpose of confining the bulk material to the surface of the belt 107. The inclined surface 115 forms a continuation from the end 85 of the mold board 83. The beam member 101 has an electric motor powered winch 185 with controls located in the control station aforementioned, and the winch 185 controls a pair of cables attached respectively directly to the inboard end of the carriage 40 and to the outboard end of the carriage 40 by way of a pulley or the like located adjacent the outboard end of the boom. By operation of the winch 185, the carriage 40 can be traversed along the boom 100.

Figure 5A:
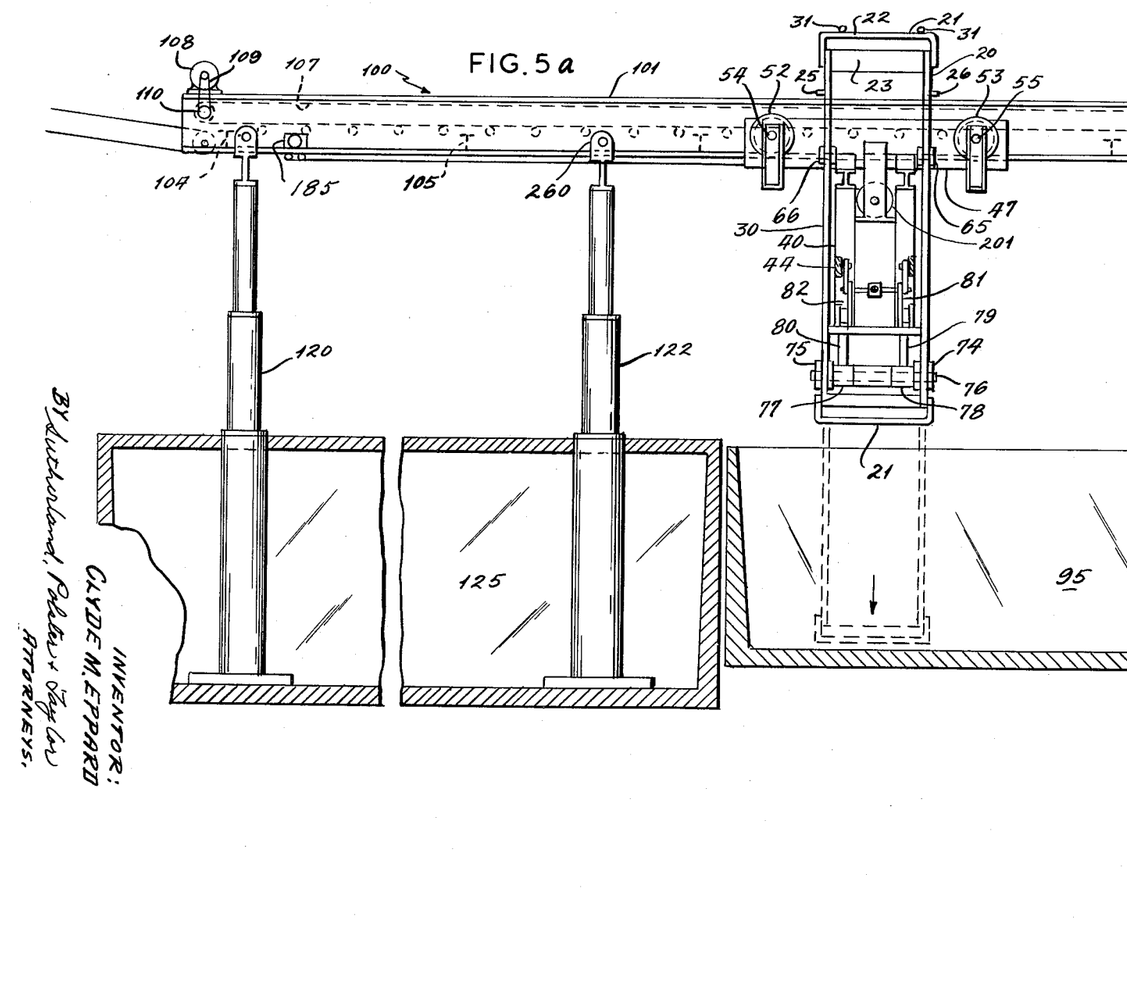
FIGS. 5a and b when taken together illustrate in end elevation and partly in section the supporting means for carrying the rotary wheel type unloader shown in the side elevation in FIG. 1.

The assembly including the elements aforedescribed may take different forms. One of these forms may be considered more or less portable since it has a floating support, and this particular form is shown in FIGS. 5a and b and FIGS. 7 through 9, inclusive. With reference to these figures and particularly 5a and b, the boom 100 is supported in this form adjacent its opposite ends by pairs of support elements 120 and 122 at its inboard end and pairs of support elements 124 and 126 adjacent its outboard end. One only of each pair of support elements is shown and these are detachably connected with the beam 101. It will be understood that the other support element of each pair of support elements is similarly connected with the beam 102. The particular detachable connection for each support element with its particular beam is broadly disclosed in a schematic illustration of FIG. 6. According to this view, the support element, for example 126, has a U-shaped saddle 260 with opposite apertures in the saddle through which extends a pin 261. This pin is received by a hole in the web of the beam 101. The inboard pairs of supports 120 and 122 are secured to a cell 125. This cell may be a single pontoon, such as illustrated in FIG. 5a. The outboard pairs of support elements 124 and 126 and also in turn supported on the bottom of a cell 127. The cell 127 may also be a pontoon, or as an alternative, the pair of supports 124 may be mounted in a pontoon or cell separate from the pair of supports 126. In either form, however, the distance between the pontoons 125 and 127 is fixed and is preferably about 55 feet to accommodate a 50 foot barge therebetween, shown at 95. In the preferred form of the invention, the pairs of supports 120, 122, 124 and 126 are hydraulic jacks, and these hydraulic jacks have pressure fluid supply systems connected therewith which extend to and may be operated from the aforesaid control station. The hydraulic pressure circuit for the jacks is interconnected so that all of the jacks may be raised and lowered simultaneously, and the hydraulic circuit between the pairs of jacks 124 and 126 is also arranged to be individually controlled so as to lower the pair of jacks 124 independently of the jacks 126 and vice versa. The purpose of this construction will appear hereinafter. It is obvious with such a control that when all of the jacks are raised, the boom 100 will be raised and when all f the jacks are lowered, the boom 100 will be lowered. Each of the jacks has a travel long enough to raise the boom 100 to a point where the bottom of the wheel 10 clears the upper surface of the barge 95. All of the jacks also may be lowered simultaneously so as to lower the boom 100 until the wheel 10 rests upon the lower surface of the hold in the barge 95.

The advantage of this construction is that the pontoons will raise and lower with the water level the same as the barge, and that any waves or change in tide will produce the same effect upon the pontoons as on the barge thereby minimizing the necessity of altering the level of the boom 100 with each change in tide. Of course, as the barge is emptied gradually its displacement will decrease so that the amount of actual travel of the boom necessary for the unloading operation is decreased.

Figure 5B:
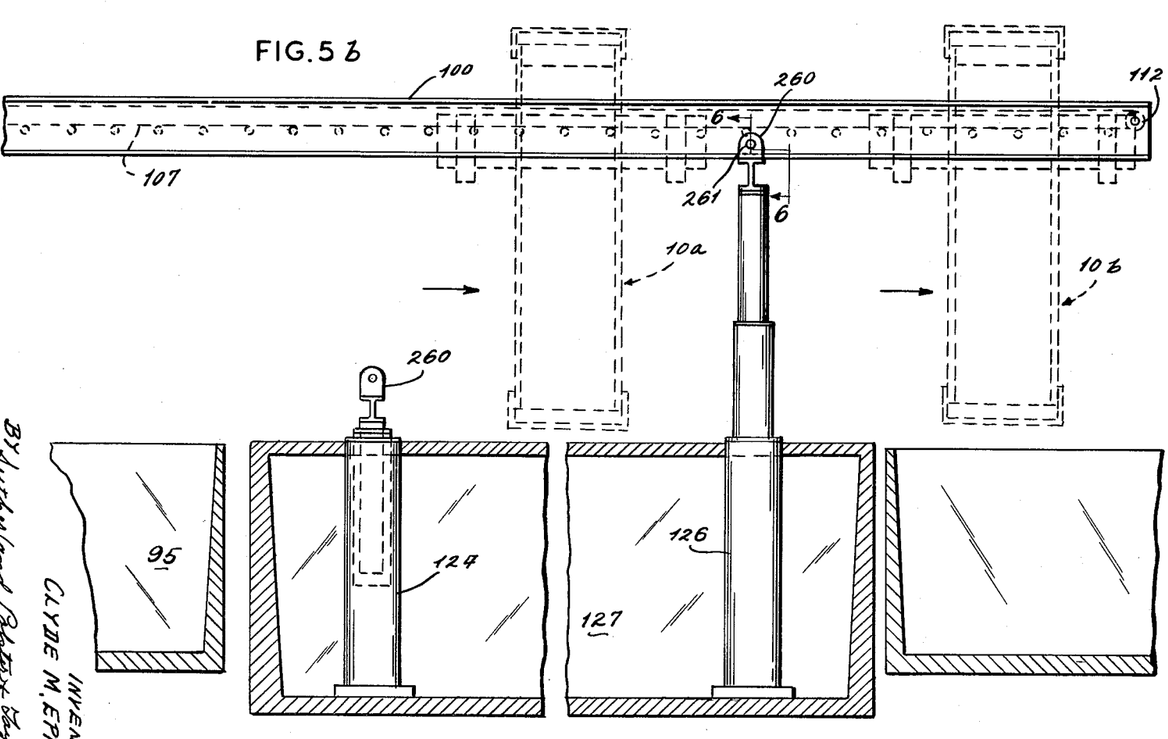

The advantage of having the pairs of jacks 124 and 126 equipped with individual control will now be described with reference particularly to FIG. 5b. As has already been pointed out with respect to FIG. 1, one of the features of this invention is the retractability of the idlers 74 and 75 by operation of the adjustments 81 and 82. When it is desired to separate carriage and wheel, the retracting mechanisms 81 and 82 are operated to free the idlers 74 and 75. The lower portion of the mold board 83 is either constructed with a removable section or is hinged and flexible so as not to interfere with raising the wheel 10 with respect to carriage 40. The wheel 10 can then be lowered to rest on the bottom of the barge and still further to disengage the pairs of rollers 61 and the pairs of drive pinions 65. With the wheel 10 resting on the bottom of the barge, the carriage then is traversed out of the wheel 10 to one side where its parts may be easily serviced. Keeping this feature in mind, the following description will explain how the wheels 10 may be interchanged, a new one for an old one.

Thus, in this operation, the carriage 40 is moved along to the pair of supports 124. These may be disconnected by removal of the pins 261 and retracted out of the way into the outboard pontoon. Assuming the boom 100 is in the raised position, carriage 40 can then be traversed along the boom until the wheel assumes the position 10a, as shown in FIG. 5b. Jacks 124 are then raised by their individual control to support the boom 100 and are connected by reinsertion of the pins 261, if that seems desirable. Jacks 126 are disconnected from the boom in the same manner and then retracted into the pontoon. Carriage and wheel then move to the position 10b, illustrated schematically in FIG. 5b, which position is above a repair barge which carries a replacement wheel. Boom 100 is then lowered until wheel 10 rests on the bottom of the work barge carrying the replacement wheel, and the wheel then tilted outwardly of the barge to clear the end of the boom 100. The work barge shown is then moved to line up the new wheel 10 with the end of the boom 100 and the carriage 40, and by the reverse steps, it is mounted on the carriage 40 and subsequently traversed inwardly of the pairs of jacks 126 and 124 successively to a work position over the barge 95.

It is also contemplated that instead of using hydraulic jacks in the pontoons, the same result could be obtained by using rotating screw jacks for suspension or support. The screws in each jack, of course, would be hooked up to be driven simultaneously or individually as required, all in a well-known manner.

Figure 7:
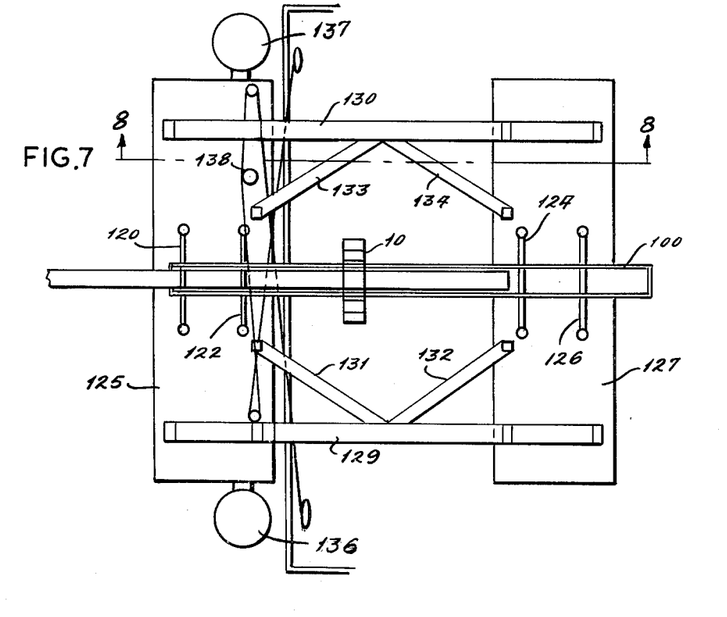
FIG. 7 is a schematic illustration in plan illustrating on a much smaller scale the complete assembly shown in FIGS. 5a and b.
Figure 8:
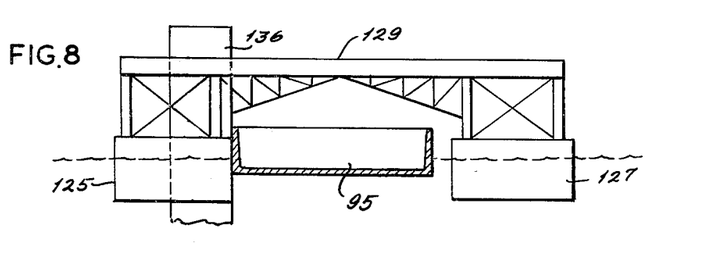
FIG. 8 is a schematic illustration in end elevation of the assembly shown in FIG. 7.
Figure 9:
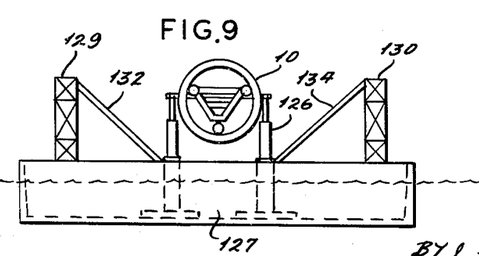
FIG. 9 is a schematic illustration in side elevation of the assembly shown in FIG. 7.

With reference to these FIGURES of the drawings, FIG. 7 shows the pair of pontoons 125 and 127 upon which the boom 100 is supported by the pairs of hydraulic jacks 120, 122, 124 and 126. The pontoons, as illustrated in FIGS. 7 and 8, are connected by bridge structures 129 and 130, each of which has a pair of diagonal braces 131 and 132 connected to bridge 129 and 133 and 134 connected with bridge 130. The inner pontoon 125 is fixed in position by a pair of mooring cells 136 and 137. These cells prevent movement of the assembly, except that movement in response to changes in water level. Each cell, for example, may be constructed of a ring or steel sheet piling driven into the bed beneath the water and filled with layers of sand and concrete. FIG. 9 illustrates the position of the wheel 10 during movement of a barge between the pontoons for unloading. Schematically illustrated on the deck of the pontoon 125 is a winch 138 which may engage several turns of a cable with opposite ends thereof extending toward the opposite ends of the pontoon 125 and provided with suitable loops at each end for engaging bits at opposite ends of the barge 95. Operation of the winch 138 moves the barge slowly between the two pontoons 125 and 127 in a lengthwise direction. Controls for the winch 138 may also be located at the aforesaid control station.

Figure 10:
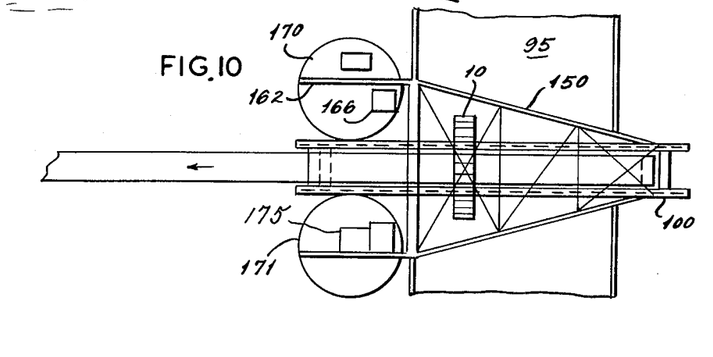
FIG. 10 is a schematic illustration on a reduced scale in plan view of a modified form of assembly to support the boom and rotary wheel type unloader.
Figure 11:
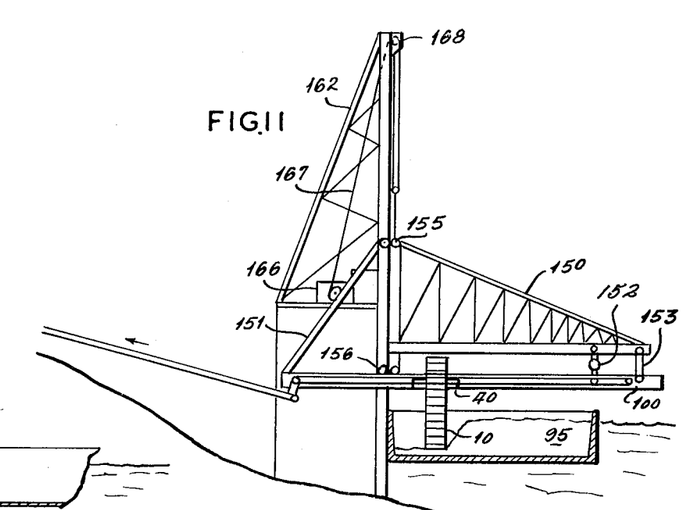
FIG. 11 is an end elevation showing a schematic illustration of the assembly shown in plan in FIG. 10.
Figure 12:
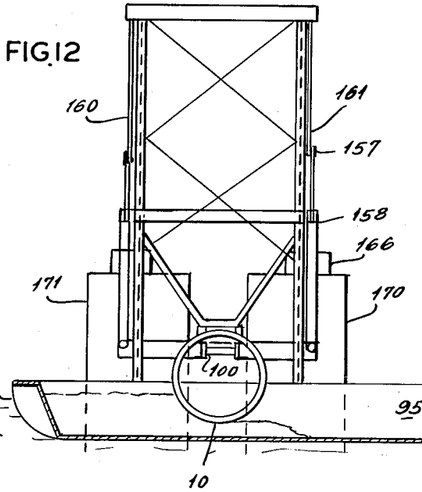
FIG. 12 is a schematic illustration in side elevation of the assembly shown in FIGS. 10 and 11.

The second form of assembly using the same boom and carriage and wheel combination is illustrated in FIGS. 10–12, inclusive. As therein schematically illustrated, a pair of cells 170 and 171 form the base for a tower, such as 162, which has vertical structural members on its outboard side. On these vertical structural members are a pair of tracks 160 and 161 extending from below the water level to the top of the tower. These tracks in turn support pairs of spaced rolls 155 and 156 which straddle the track 160, and pairs of rolls 157 and 158 which straddle the track 161. These rolls form the support for a bridge 150 to which the boom 100 is attached by the supports 151, 152 and 153. Supports 152 and 153 are separately detachable from the boom in the same manner as the pairs of jacks 124 and 126 in the previous modification. Bridge 150 is raised and lowered by a suitable block and tackle arrangement 167 and 168 operated from a winch 166 mounted on the top of the cell 170. The controls for the winch 166 are located at a control station which may be supported by the bridge so that the operator has accessible at the control station the controls for the wheel, the carriage and the bridge. On the cell 171 is a winch 175 by which through suitable cables the barge 95 may be traversed lengthwise beneath the boom 100 during the unloading operation. The controls for the winch 175 are also preferably located at the control station aforesaid.

Changes in and modifications of the construction described may be made without departing from the spirit of my invention or sacrificing its advantages.

Having thus described the invention, what is claimed and desired to be secured by Letters Patent is:

1. A rotary unloader for removing bulk material from the bin or hold of a bulk type of transporter comprising, a wheel type unloader with buckets mounted at its outer periphery, a boom formed by members connected in spaced relation, a conveyer mechanism supported on said boom and disposed to receive the contents of said buckets during rotation of said wheel type unloader, a carriage on said boom, rollers and drive gearing with axially spaced wheel engaging surfaces mounted on said carriage and arranged to engage top and bottom inside said wheel type unloader and form a rotary support for said wheel type unloader on said carriage, means on said carriage to drive said wheel type unloader adjacent its upper portion through said gearing, and a yieldable connection between one of said rollers at the lower portion of said wheel type unloader movable by the driving force through said gearing on overloading to allow said wheel to rock away from an obstruction.

2. A rotary unloader for removing bulk material from the bin or hold of a bulk type of transporter comprising, a wheel type unloader with buckets mounted at its outer periphery, a boom formed by members connected in spaced relation, a conveyer mechanism supported on said boom and disposed to receive the contents of said buckets during rotation of said wheel type unloader, a carriage on said boom, rollers and drive gearing with axially spaced wheel engaging surfaces top and bottom inside said wheel type unloader to form a rotary support for said wheel type unloader on said carriage, motor means on said carriage to drive said wheel type unloader adjacent its upper portion through said gearing, and overload type of release clutch between said motor means and said gearing, and a yieldable connection between one of said rollers at the lower portion of said wheel type unloader movable by the driving force through said gearing on overloading to allow said wheel to rock away from an obstruction.

3. A rotary unloader for removing bulk material from the bin of a bulk type of transporter comprising, a wheel type unloader, circumferentially spaced buckets open on one side and on one end mounted closed side out on the periphery of said wheel with their open sides inward and their open ends facing in one direction of rotation, a boom having spaced side by side members, a conveyer mechanism supported on and extending along said boom below the top of said wheel, a carriage on said boom, an arcuate flexible metal mold board extending from adjacent the bottom of said wheel to above said conveyer means for closing the open sides of said buckets moving upwardly, strut means on said carriage rigidly supporting the upper part of said mold board on said carriage, rollers and drive gearing with axially spaced wheel engaging surfaces mounted on said carriage and arranged to engage top and bottom inside said wheel type unloader and form a rotary support for said wheel type unloader on said carriage, means on said carriage to drive said wheel adjacent its upper portion through said gearing and a yieldable connection between one of said rollers at the lower portion of said wheel movable by the driving force through said gearing on overload to allow said wheel to rock away from an obstruction.

4. A rotary unloader for removing bulk material from the bin or hold of a bulk type of transporter comprising an open wheel type unloader, circumferentially spaced buckets open on one side and one end mounted closed side out on the periphery of said wheel with their open sides inward and their open ends facing in one direction of rotation, a boom formed by members connected in spaced relation extending through the upper half of said open wheel type unloader, a conveyer mechanism supported on said boom below the buckets in the upper portion of said wheel, an underslung carriage, wheels on said carriage supporting said carriage for movement along the underside of the members forming said boom, an arcuate metal mold board extending from adjacent the bottom of said wheel to above said conveyor means for closing the open inner sides of said buckets moving upwardly, strut means on said carriage rigidly supporting the upper part of said mold board on said carriage, rollers and drive gearing with axially spaced wheel engaging surfaces mounted on said carriage and arranged to engage top and bottom inside said wheel and form a rotary support for said wheel on said carriage, means on said carriage to drive said wheel adjacent its upper portion through said gearing in a direction to cause the open ends of said buckets to dig, said carriage, drive means and struts being located within the confines of said wheel so as to provide at least half the diameter of the wheel type unloader for active digging.

5. The combination as defined in claim 4 in which the sides of said buckets extend beyond the sides of said wheel in an axial direction to permit axial movement of said wheel by operation of said carriage during digging.

6. A rotary unloader for removing bulk material from the bin or hold of a bulk type of transporter comprising, an open wheel type unloader, a plurality of axially spaced rings in said wheel, circumferentially spaced buckets open on one side and one end supported about the periphery of said wheel and connected to said rings with their open side inward and their open ends facing in one direction of rotation, a boom formed by members connected in spaced relation extending through the upper half of said wheel, a conveyer mechanism supported on said boom below said buckets in the upper portion of said wheel, an underslung carriage, wheels supporting said carriage for movement along the underside of the members forming said boom, rollers and drive gearing with axially spaced wheel engaging surfaces mounted on said carriage and arranged to engage top and bottom inside said wheel and form a rotary support for said wheel on said carriage, an arcuate stationary mold board extending from the bottom of said wheel to adjacent said conveyer means at the top portion of said wheel to close the open side of said buckets moving upwardly, strut means on said carriage to support said mold board, and means on said carriage to drive said wheel through said gearing in a direction to cause the open ends of said buckets to dig, said carriage, drive means and struts being located within the confines of said wheel so as to provide at least half the diameter of the wheel type unloader for active digging so that only said boom positioned with respect to said transporter limits wheel penetration during digging.

7. A rotary unloader for removing bulk material from the bin or hold of a bulk type of transporter comprising, an open wheel type unloader, a plurality of axially spaced rings in said wheel circumferentially spaced buckets open on one side and one end supported about the periphery of said wheel and connected to said rings with their open side inward and their open ends facing in one direction of rotation, a boom formed by members connected in spaced relation extending through the upper half of said wheel, a conveyor mechanism including a conveyer belt supported on said boom below the buckets in the upper portion of said wheel and located between the spaced members forming said boom, an underslung carriage, wheels supporting said carriage for movement along the underside of the members forming said boom, power means for operating said carriage on said wheels, axially spaced pairs of supporting rollers and drive gearing mounted on said carriage and arranged to engage internally of said axially spaced rings of said open wheel to form a rotary support for said wheel on said carriage, a stationary metal mold board extending from the bottom of said wheel to adjacent said conveyer means at the top portion of said wheel to close the opensides of said buckets moving upwardly, strut means on said carriage to support said mold board and means on said carriage to drive said wheel through said gearing in a direction to cause the open ends of said buckets to dig, said carriage, drive means and struts being located within the confines of said wheel so as to provide at least half the diameter of the wheel type unloader for active digging.

8. A rotary unloader for removing bulk material from the bin or hold of a bulk type of transporter comprising, an open wheel type unloader, circumferentially spaced buckets open on one side and one end mounted closed side out on the the periphery of said open wheel with their open sides inward and their open ends facing in one direction of rotation, a boom having spaced side by side members, means for raising and lowering said boom, a conveyer mechanism supported on and extending along said boom below the top of said wheel, a carriage on said boom, wheels supporting said carriage for movement along the underside of said boom, power means for operating said carriage, rollers and drive gearing with axially spaced wheel engaging surfaces mounted on said carriage and arranged to engage top and bottom inside said wheel and form a rotary support for said wheel on said carriage, means on said carriage to drive said wheel adjacent its upper portion through said gearing and a connection for retracting one of said rollers at the lower portion of said wheel so that by lowering said boom by said means after said wheel rests upon a solid surface said drive means may be disengaged from said wheel and said carriage moved from within said wheel by said power means.

9. A rotary unloader for removing bulk material from the bin or hold of a bulk type of transporter comprising a wheel type unloader with buckets mounted at its outer periphery, a boom formed by members connected in spaced relation, a conveyor mechanism supported on said boom and disposed to receive the contents of said buckets, a wheeled carriage on said boom movable therealong, rollers and drive gearing with axially spaced wheel engaging surfaces mounted on said carriage and arranged to engage about the inside of said wheel and form a rotary support for said wheel on said carriage, means on said carriage to drive said wheel through said gearing, a yieldable connection between said rollers and gearing and said wheel movable by the driving force through said gearing on overloading of said wheel to allow said wheel to rock away from an obstruction, and anti-snag rods supported on said wheel and projecting beyond the path of said buckets to lift said wheel on striking an obstruction against the resilient force of said yieldable connection.

10. A rotary unloader for removing bulk material from the bin or hold of a bulk type of transporter comprising a wheel type unloader with buckets mounted at its outer periphery, a boom formed by members connected in spaced relation, a conveyer mechanism supported on said boom and disposed to receive the contents of said buckets, a wheeled carriage on said boom movable therealong, rollers and drive gearing with axially spaced wheel engaging surfaces mounted on said carriage and arranged to engage around the inside of said wheel and form a rotary support for said wheel on said carriage, means on said carriage to drive said wheel through said gearing, a structure for supporting said boom at spaced points beyond the normal working range of movement of said carriage along said boom, said structure including means to raise and lower the boom bodily and readily detachable connections between said means and said boom to facilitate movement of the carriage and wheel to a position on the boom where wheels can be replaced.

11. A rotary unloader for removing bulk material from the bin or hold of a bulk type of transporter such as a barge, comprising a wheel type unloader with buckets mounted at its outer periphery, a boom formed by members connected in spaced relation, a conveyer mechanism supported on said boom and disposed to receive the contents of said buckets, a wheeled carriage on said boom movable therealong, rollers and drive gearing with axially spaced wheel engaging surfaces mounted on said carriage and arranged to engage the inside of said wheel and form a rotary support for said wheel on said carriage, means on said carriage to drive said wheel through said gearing, and a structure for supporting said boom at spaced points beyond the normal working range of movement of said carriage along said boom at one end of said boom, said structure including spaced buoyant cells at one end of said boom spaced to permit the movement therebetween of the carriage and wheel.

12. A rotary unloader for removing bulk material from the bin or hold of a bulk type of transporter such as a barge comprising a wheel type unloader with buckets mounted at its outer periphery, a boom formed by members connected in spaced relation, a conveyer mechanism supported on said boom and disposed to receive the contents of said buckets, a wheeled carriage on said boom movable thereon, rollers and drive gearing with axially spaced wheel engaging surfaces mounted on said carriage and arranged to engage the inside of said wheel and form a rotary support for said wheel on said carriage, means on said carriage to drive said wheel through said gearing, and a structure for supporting said boom at spaced points beyond the normal working range of movement of said carriage along said boom, said structure including spaced buoyant cells at opposite ends of the boom and separate spaced elements on said cells projecting upwardly to said boom and detachably connected to said boom at spaced points lengthwise thereof.

13. The combination defined in claim 12 in which said separate spaced elements may be raised and lowered independently or simultaneously.

14. A rotary unloader for removing bulk material from the bin or hold of a bulk type of transporter such as a barge comprising a wheel type unloader with buckets mounted at its outer periphery, a boom formed by members connected in spaced relation, a conveyer mechanism supported on said boom and disposed to receive the contents of said buckets, a wheeled carriage on said boom movable therealong, rollers and drive gearing with axially spaced wheel engaging surfaces mounted on said carriage and arranged to engage within said wheel and form a rotary support for said wheel on said carriage, means on said carriage to drive said wheel through said gearing, and a structure for supporting said boom at spaced points at its opposite ends beyond the normal working range of movement of said carriage along said boom, said structure including spaced pairs of jack elements for engaging beneath and supporting each of said boom members, means connected with said jack elements for raising and lowering each pair thereof separately or simultaneously with the other pairs and spaced cell members located adjacent opposite ends of the boom to receive a barge therebetween each of said cell members supporting two of said pairs of jack elements.

15. A rotary unloader for removing bulk material from the bin or hold of a bulk type of transporter such as a barge comprising a wheel type unloader with buckets mounted at its outer periphery, a boom formed by members connected in spaced relation, a conveyor mechanism supported on said boom and disposed to receive the contents of said buckets, a wheeled carriage on said boom movable thereon, rollers and drive gearing with axially spaced wheel engaging surfaces mounted on said carriage and arranged to engage within said wheel and form a rotary support for said wheel on said carriage, means on said carriage to drive said wheel through said gearing, and a structure for supporting said boom at spaced points along its length to provide for movement of said carriage therealong throughout the working range of movement of said carriage along said boom, said structure including a pair of spaced cells, a tower supported on said cells and projecting vertically thereof, a bridge supported for vertical movement by said tower and detachable connections between said bridge and said boom at spaced points therealong.

16. A rotary unloader for removing bulk material from the bin or hold of a bulk type of transporter such as a barge comprising a rotary wheel type unloader, a plurality of axially spaced rings in said wheel type unloader, circumferentially spaced buckets open on one side and one end supported about the periphery of said wheel and connected to the outside of said rings with their open side inward and their open ends facing in one direction of rotation and extending laterally beyond said rings, a boom formed of connected members extending through the upper half of said wheel, an underslung carriage, wheels supporting said carriage for movement along said boom, a rotary support on said carriage for said wheel type unloader, means to drive said wheel type unloader on said rotary support, an arcuate stationary metal mold board extending from the bottom of said wheel to the top thereof to close the open side of said buckets moving upwardly so that said wheel will continue to operate in any direction of movement with respect to the load of bulk material, and means for traversing said carriage along said boom and for moving said barge with respect to said boom to feed the material in the barge to the unloader.

17. A rotary unloader for removing bulk material from the bin or hold of a bulk type of transporter such as a barge comprising, a wheel type unloader with buckets mounted at its outer periphery, a boom extending transversely of the barge and through said wheel type unloader, a conveyer mechanism for moving material lengthwise of said boom and disposed to receive the contents of said buckets during rotation of said wheel type unloader, an underslung wheeled carriage on said boom, a rotary mounting on said carriage for said wheel type unloader, and a drive train on said carriage having a pinion for engaging with driven means on said wheel type unloader.

18. The combination as defined in claim 17 in which wearing parts in said pinion and driven means are detachably connected with said drive train and driven means respectively for ready replacement.

19. The combination as defined in claim 17 which includes means to raise and lower said boom and means for releasing said wheel type unloader from said carriage to provide for manipulation of the unloader to separate said carriage from said wheel type unloader.

20. A rotary unloader for removing bulk material from the bin or hold of a bulk type of transporter such as a barge, comprising a rotary wheel type unloader with buckets mounted at its outer periphery, a boom formed by members extending through said wheel type unloader, a conveyor mechanism supported by said boom and disposed to receive the contents of said buckets, a wheeled carriage on said boom movable therealong and provided with a frame structure suspended below said boom and within the confines of said rotary wheel type unloader to allow penetration of said buckets into the bin or hold to a depth permitted by the bottom of the bin or hold or permitted by clearance between the boom and the sides of the bin or hold, a rotary support for said rotary wheel type unloader located on said carriage and on said frame structure, motor means on said carriage for driving said rotary wheel type unloader, and means for vertically supporting said boom transverse to the barge to change the vertical position of said boom with changes in displacement of the barge.

References Cited in the file of this patent

UNITED STATES PATENTS

| | | |
|---|---|---|
| 484,763 | Bowers | Oct. 18, 1892 |
| 1,804,287 | Spry | May 5, 1931 |
| 2,237,773 | Van Voorhis et al. | Apr. 8, 1941 |
| 2,322,504 | Brandon | June 22, 1943 |
| 2,801,014 | Colson | July 30, 1957 |
| 2,916,002 | Hunsucker | Dec. 8, 1959 |

FOREIGN PATENTS

| | | |
|---|---|---|
| 537,977 | Great Britain | July 16, 1941 |
| 964,850 | Germany | May 29, 1957 |

OTHER REFERENCES

News of Industry, vol. IV—No. 3, Autumn 1959, published by Hewitt-Robins.